US006928443B1

(12) United States Patent
Giambalvo

(10) Patent No.: US 6,928,443 B1
(45) Date of Patent: Aug. 9, 2005

(54) FRAMEWORK FOR CREATING SEARCH SYSTEMS OF NETWORKED RESOURCES

(76) Inventor: Daniel Joseph Giambalvo, 12 Derby Pl., Kings Park, NY (US) 11754

( * ) Notice: Subject to any disclaimer, the term of this patent is extended or adjusted under 35 U.S.C. 154(b) by 422 days.

(21) Appl. No.: 10/082,525

(22) Filed: Feb. 22, 2002

Related U.S. Application Data

(60) Provisional application No. 60/270,166, filed on Feb. 22, 2001.

(51) Int. Cl.[7] .............................................. G06F 17/30
(52) U.S. Cl. ....................................... 707/10; 707/102
(58) Field of Search .......................... 707/10, 102, 103

(56) References Cited

U.S. PATENT DOCUMENTS 6,088,651 A * 7/2000 Nageswaran ................ 701/208
6,111,579 A * 8/2000 Alimpich et al. ........... 345/853
6,199,059 B1 * 3/2001 Dahan et al. .................. 707/3
6,243,746 B1 * 6/2001 Sondur et al. .............. 709/220
6,578,090 B1 * 6/2003 Motoyama et al. ......... 719/315

* cited by examiner

Primary Examiner—Jack M. Choules
(74) Attorney, Agent, or Firm—IP Strategies

(57) ABSTRACT

A modular and flexible framework for creating search systems of networked resources. The framework utilizes an abstraction layer between a user of network resources and the underlying resource types and access methodologies to allow the processing of different resource types simultaneously. The system framework accepts resource types and access methodologies through self-contained modules which can be easily deployed and combined. The end result is a unified search system capable of handling heterogeneous network resources and resources from heterogeneous network access methodologies with a single point of access for the user, and simplified setup for the administrator.

20 Claims, 6 Drawing Sheets

Two-Tier Search System: Logical Components Diagram

Two-Tier Search System: Logical Components Diagram

FRAMEWORK FOR CREATING SEARCH SYSTEMS OF NETWORKED RESOURCES

CROSS-REFERENCE TO RELATED APPLICATION

This is based on U.S. provisional patent application Ser. No. 60/270,166, filed on Feb. 22, 2001, which is incorporated herein in its entirety.

FIELD OF THE INVENTION

In general, the present invention relates to methods for creating search systems. In particular, the present invention is a method for setting up a framework to handle searches for heterogeneous resource types and/or searches over heterogeneous resource access methodologies.

BACKGROUND OF THE INVENTION

Presently, setting up a search system for network resources requires a significant administrative effort on the part of whoever is preparing the system. An administrator must know in advance what type of resources one wishes to search. Also required is configuring a data storage mechanism (also known as a data store) to hold the relevant information which will be captured in the search mechanism. In addition the administrator must write (or set up) software to perform the task of indexing network resources and storing this information in the data store. Then, after these mechanisms have been prepared, the administrator can create an interface to the search system, often through a web interface to execute SQL on data stored in a database.

There are inherent disadvantages in such search systems which are presently available to those who wish to set up a search system. For example, there exists a substantial overhead to those who wish to set up such a system. The designer of the system must know beforehand what types of resources they wish to search, and what properties of those resources they wish to index. Because standard data storage mechanisms (such as data bases) tend to store static data arrangements, changes to the structure of a data storage mechanism are generally costly and not easily accomplished.

Further, the administrator of such a search system must configure a mechanism to index available resources and store the information pertaining to those resources within their data store. This can be accomplished via certain scripting methodologies, or may require writing new software. In either case, work is involved in setting up the indexing mechanism and configuring it to pull the correct necessary properties about different resources. Work is also involved in then linking this indexing mechanism to the data store. In addition, the administrator must set up a way for users to access the search system, often through a mechanism which queries the database based on its static structure and returns results in the form of an HTML document.

Overall, the static nature of both the indexing and data storage mechanisms in presently available systems leave them poorly equipped to handle the integration of multiple types of network resources, or network resources available via different access methodologies. For example, while it might be reasonable to construct a search mechanism for HTML documents, or for Microsoft® Word documents, integrating the two becomes significantly more complex. For example, to store the unique properties of HTML documents and Word documents which the two don't share, additional columns and tables would have to be added to the storage mechanism. Then, the query mechanism would have to be enhanced to be able to utilize the properties of the two types of documents, but still allow for the fact that some documents might not have requested properties. One might desire to use the author property of Word documents to refine their search, but this leaves the question of how to handle HTML documents which don't possess a known author. Furthermore, the indexing mechanism would also be complicated because it would have to index in two separate locations and for two separate types of files. An alternative might be to set up multiple search systems, but this poses open questions regarding how to integrate the results of these systems into a unified system which is easily accessed by the end user.

Further, presently available systems do not offer a sufficient mechanism for special case handling of search results based on their type or network access methodology. Most current search systems simply return results in the form of links through a web browser or other display mechanism. This leaves the access up to the web browser/operating system. While this works well for web documents, it limits possible results to those accessible by the web browser/operating system and those results which can be expressed as a link. It also lacks the ability to specify different access methods for different results. For example, one result might be from a computer across a LAN, while another might be from an FTP site. Finally, it lacks the ability to utilize special functionality available to certain resource types. For example, a Word document can be merged with an address list, which HTML documents cannot do. With presently available search systems an entirely separate layer would need to be written on top of the above described search system for accomplishing such tasks.

Thus, there are many areas for improvement within the current systems. It is desirable to have a system which is modular to handle different types of resources and network access methodologies. This modular system could easily handle both different access methodologies and different types of resources, and have a generalized system for searching and handling the different properties of different resources. The end goal of this system would be to create a single search system for end users which could return all results regardless of their type or location, and allow them to be accessed through a unified interface. Also, these "modules" would be reusable which would considerably simplify the work involved in multiple deployments, and would mask the underlying issues of data storage simplifying the task of the administrator. All of these goals can be accomplished by designing a framework into which modular searchable objects can interact, and building into the framework the necessary functionality to handle other complexities of the system.

SUMMARY OF THE INVENTION

The present invention relates to setting up a search system to facilitate searches through networked resources, such as resources available on the internet or on local intranets.

According to one aspect of the present invention, a generalized framework for handling and accessing different types of resources is made available over different network access methodologies. A layer of abstraction is created between the way each source (network access methodology) or resource operates or is operated upon, and a general set of functions or properties which all sources or resources have. For example, a general function might be "copy". Different resources might copy things in different ways.

Copying a file from one computer to another is a different task than copying a file from an FTP site to the local computer. These operations are allowed to be masked below the layer of abstraction, so that different types of resources and sources can all be treated the same, and still handle their own specific needs.

To accomplish this goal, the framework is divided into two tiers. The first tier is a general set of functions and properties which provide a common "language", also referred to as an API. Conceptually, consider this set of properties and functions as defining a type of object. For example, one function of this type of object might be "copy". Copy in the first tier doesn't accomplish any task itself. Copy in the first tier describes an action: "Copy will take a resource, and duplicate it from somewhere to somewhere else."

The second tier of the framework contains the actual implementation of functions defined in the API. Returning to the object analogy, the second tier consists of implementations of the functions described by the general object in the first tier. Continuing the copy example, an object in the second tier might represent a file on a remote computer. The copy function would then copy the file via Local Area Network file transfer protocols. An object in the second tier which represents a website might interpret copy to mean downloading and saving a copy of the website. By allowing second-tier objects to individually implement the actions defined in the first tier, second-tier objects can each behave differently based on their own context.

Properties can be handled in a similar fashion. In the first tier there are defined a number of different properties which objects can have. Examples of properties are size, modified date, author, or copyright holder. These properties might be hard coded, or might be implemented via modules that plug into the framework defining properties and how to determine them. In the second tier, different objects can report the properties they possess, and ignore the properties that are not relevant. One property might be the size. Files would report that property because it is relevant. Addresses would likely not report a size. A second property might be modified date. This is a property that both Addresses and Files could report, although they would possess slightly different meanings.

Once the framework is built, meaning that the first and second tiers have been created, the search system can be easily utilized. For example, the user might use the framework to perform a search. Each object in the framework has a function called "Search". Again, this Search might mean one thing for an object representing a directory, and something completely different if the object represents a search engine. Either way, the search will be performed as required by the object, and all searches will return a set of results in the form of other objects. The user could then call the Copy function on any one of these objects, and it would be copied. To perform a search over multiple objects is a simple iterative function. One can also have a type of object which contains other objects as children, building a tree-type structure. This is a common way for the framework to be set up. In this scenario, one would call a function such as search on a node in the tree, and have the search iterate throughout the branch of the tree.

The design described above for this invention possesses several advantages over presently available technologies to create search systems. One object of the invention is to provide a search system that is based on a modular design. Each module can contain several second tier objects which correspond to different network access methodologies and/or different types of resources available over those methodologies. These modules would contain all the necessary programming to index resources, store the results of the index, and handle searching over those results. These modules need only be written once, and can be reused in multiple systems, greatly simplifying the work required to deploy a new search system. The modules can also support configuration options so administrators can choose common options they want easily, without the need to address the underlying mechanisms to accomplish those options.

Another object of the invention is to provide a search system that easily handles multiple types of resources and network access methodologies simultaneously. Because all sources and resources in the system speak the same predefined "language", they can easily be used together in a heterogeneous mixture. If a user wants to copy an object they found, it is a simple matter to call the copy command regardless of its type. The rest of the issues regarding how to copy based on the type of object are handled automatically.

Another object of the invention is to provide a search system that easily handles changes to what is made available via the search system. Because all objects speak the same language, the upper level search mechanisms can be designed to handle any object so long as it speaks the predefined language which all objects will. Once this is accomplished, the same search mechanism can work regardless of the object types. Because all objects list properties in the same fashion, the search mechanisms can use a single set of search parameters to search over heterogeneous objects. As objects are added or changed, the search mechanism will handle these changes automatically.

Another object of the invention is to provide a search system that employs a simple way to provide results to the user in a fashion that encapsulates all the special functionality of various types. By simply returning the objects to the user, the interface automatically provides the user with a system which handles all the unique functionality of any resource in the system. This eliminates the issues involved in returning results via web pages or maintaining dependence on underlying operating system functionality.

According to a particular aspect of the present invention, a framework for creating a search system of network resources includes a first tier defining sources/resources API, and a second tier providing specific implementations of the sources/resources API. The first tier can include a tree of accessible/searchable objects built of NetResource types. The tree of accessible/searchable objects built of NetResource types can include at least one virtual NetResource and a plurality of non-virtual NetResources. The virtual NetResource organizes the plurality of non-virtual NetResources into groups and sub-groups. The first tier can include manager classes, which can be any combination of download managers, scan managers, and properties managers. The first tier can include resource handles and threading classes.

According to another aspect of the present invention, a framework for creating search systems includes an abstraction layer to provide a user with a common interface to heterogeneous network objects. The abstraction layer includes source/resource API defined through at least one virtual NetResource class, a tree of accessible/searchable objects built of NetResource types, at least one manager class, at least one resource handle, and at least one thread class.

According to an additional aspect of the present invention, a search system utilizing an abstraction layer to handle heterogeneous network resources and heterogeneous access methodologies includes a framework incorporating self-contained modules containing derived NetResource types, and means for deploying and combining the modules.

According to another aspect of the present invention, a framework for creating search systems of network access methodologies includes a first tier defining sources/resources API, and a second tier providing specific implementations of the sources/resources API. The first tier can include a tree of accessible/searchable objects built of NetResource types. The first tier can include manager classes, which can include any combination of download managers, scan managers, and properties managers. The first tier can include resource handles and threading classes.

According to another aspect of the present invention, a search system includes a tree of accessible/searchable objects built of NetResource types, including at least one NetResource subtype. The NetResource subtype can include one or more virtual NetResources, resource NetResources, container NetResources, and service NetResources.

According to another aspect of the present invention, a framework for creating search systems with NetResources organized in a tree structure includes a first Virtual NetResource serving as a root, and at least one other virtual net resource. The other virtual net resources branch from the first Virtual NetResource.

According to an additional aspect of the present invention, a method for scanning a plurality of container NetResources includes initiating a call to a common API such that the common API enables a scanning procedure specific to a particular container NetResource.

According to another aspect of the present invention, a method for searching container NetResources includes initiating a call to a common API such that the common API enables a searching procedure specific to a particular container NetResource.

DETAILED DESCRIPTION OF THE INVENTION

In an exemplary embodiment of this invention, there are two tiers which interact to perform the desired tasks (FIG. 1):
First Tier: A generalized framework defining the Sources/Resources API, and other components which enable functionality.
Second Tier: Specific implementations of the Source/Resource API The first tier is comprised of the generalized framework which interacts with the outside world and contains both the Source/Resource API definition as well as several other components. The framework provides a series of managers which can be used to perform different tasks such as scanning, copying, etc. The framework also provides other components such as Resource Handles and Threading classes. Additionally, the Framework defines the basic API for working with objects, and provides access to the tree of objects for use by the outside world.

Figure 2:
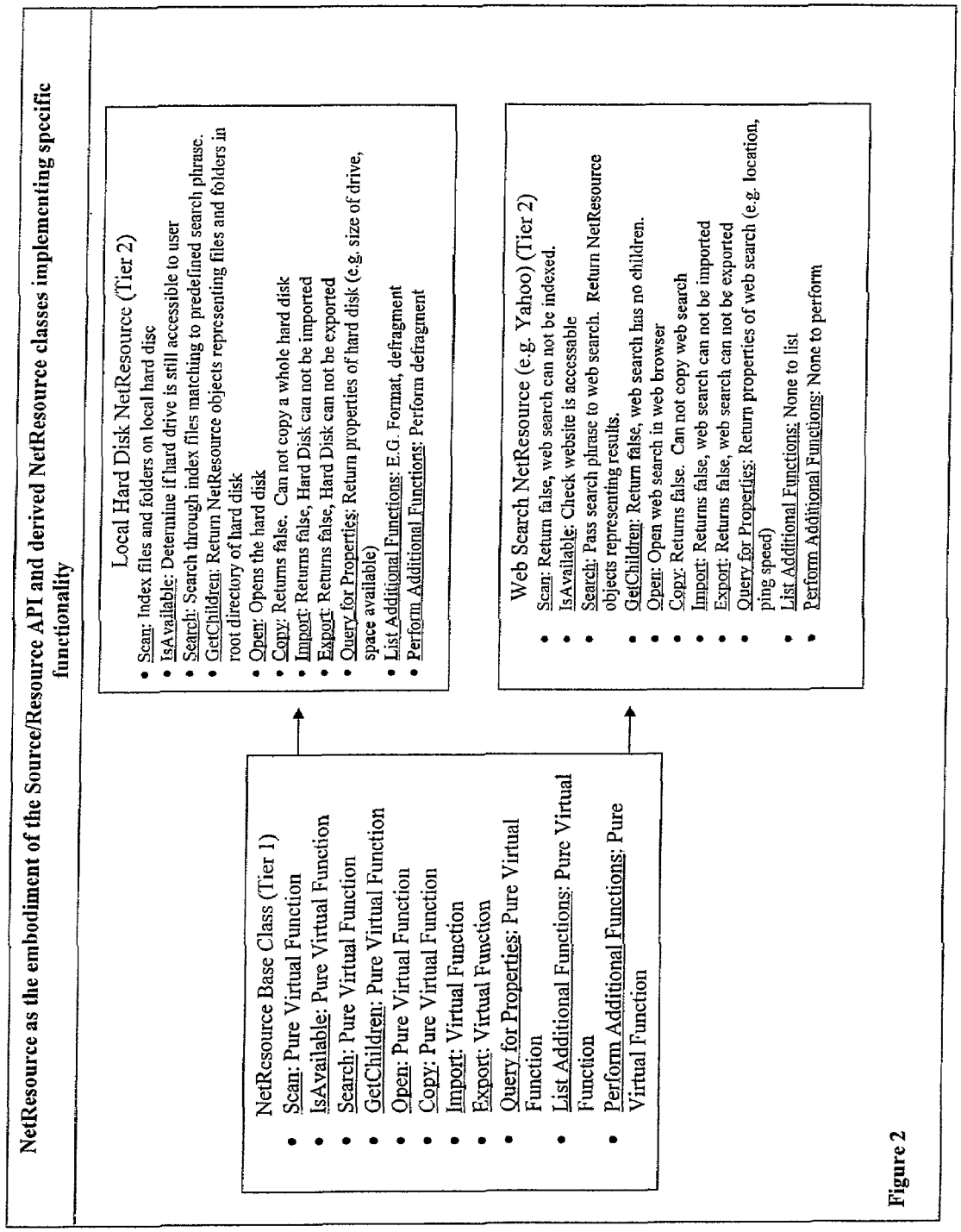
FIG. 2 shows the NetResource base class as the embodiment of the Source/Resource API and derived NetResource classes implementing specific functionality.

The NetResource is a virtual class, also referred to as the NetResource base class, which acts as the base for all NetResource derived types in the second tier of the system. The NetResource embodies the Source/Resource API through a set of virtual functions. The NetResource class creates a layer of abstraction between a common set of functions in the API and the specific implementations of NetResource derived classes which support this API. When objects in the second tier are derived from NetResource, they must implement these relevant virtual functions, and in doing so inherently speak the language of the API. By taking advantage of these functions and polymorphism through C++, all NetResource derived types can interact with the framework in common and general way (FIG. 2). The list of virtual functions includes:

Scan: The ability to perform an indexing step from this NetResource. This indexing step will keep the NetResource up to date with what is available in it. For example, if a NetResource represents a local hard drive, the Scan function will see what folders and files are available in that drive. The Scan step is typically recursive, meaning that after the local drive is done scanning, it might call Scan on each of the folders (which are containers) to see what they contain. This can continue through all sub-containers.

IsAvailable: The ability to determine if a specific resource is still available.

Search: Searches a NetResource for resources. This function might match a search string to available files, and recursively pass the search onto other sub-containers. Alternatively, a Web Search NetResource might issue a search to a web server and return the results.

GetChildren: Retrieves all children of a given NetResource. Children can be any type of NetResource. If a NetResource represented a folder, its children would be the files and subdirectories of that folder.

Consumption Functions: These functions allow the framework to make available functions to actually "use" a NetResource. Examples of consumption functions are opening or copying a NetResource.

Import/Export: The ability to send and receive NetResources between instances of the invention. This is also known as marshalling.

Query for Properties. NetResources can have any set of properties, and a NetResource can be queried for its properties through a standard call. These properties can then be used for searches or for displaying NetResource information.

In addition to these general functions, NetResource also supports a system for additional type-specific functionality. This allows the implementer of specific types of NetResources to add flexibility easily to their NetResources. All NetResources have a pair of functions, one of which lists other available functions and the other of which calls a function from this list. For example, a NetResource might represent a database. If so, an extra function it might list would be to execute an SQL query. This special function can then be called on the object and the function would be performed. Other NetResource types which do not support SQL would simply not list this as a function that can be performed.

Figure 3:
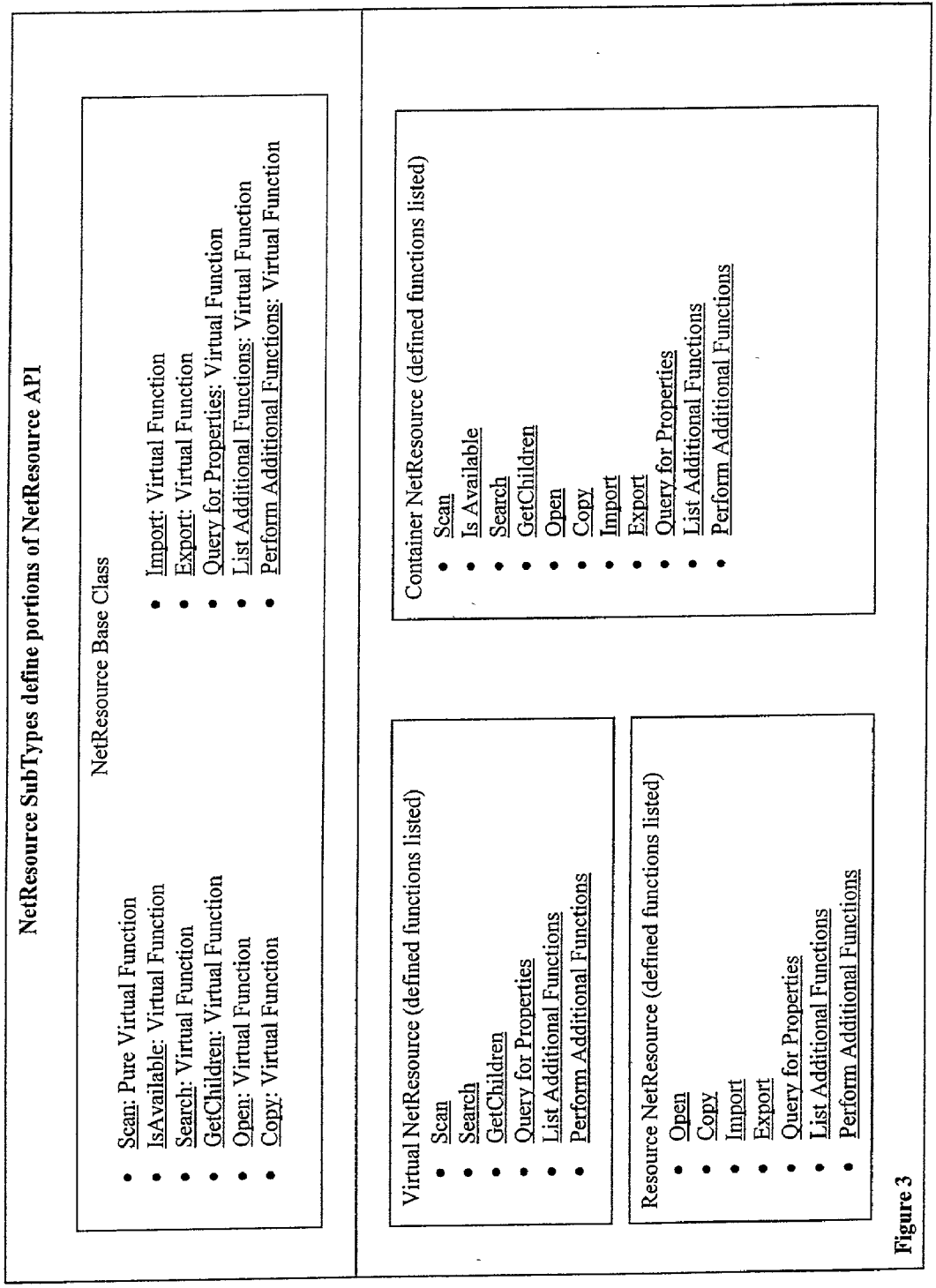
FIG. 3 shows several NetResource subtypes and the portions of the API they define.

As shown in FIG. 3, the NetResource base class defines the entire language of all types of NetResources. As also shown in FIG. 3, NetResources can be one of several subtypes. Each subtype represents a different type of logical object in the "networked" universe, and as such only needs to implement a different subset of the full language supported by the NetResource base class. For example, one subtype is a Resource NetResource. A Resource NetResource represents a discrete object, like a file or a webpage. Resource NetResources do not need to support functions such as Scan or GetChildren because they do not contain children. Resource NetResources do support functions such as open, copy, or print. A second type of NetResource is the Container NetResources. Container NetResources represent containers which hold other NetResources. An example of a Container NetResource would be a directory on a local drive. This directory would contain Resource NetResources (files) and other Container NetResources (subdirectories). A Container NetResource can be Scanned, or Opened, but cannot be printed.

A third example is a Virtual NetResource. A Virtual NetResource works similarly to a Container, but is created only to hold other NetResources in the framework of the invention. This means that a Virtual NetResource does not actually exist outside of this invention (whereas Container NetResources do.) Because of this, they do not support functions like Open or Copy.

Figure 4:
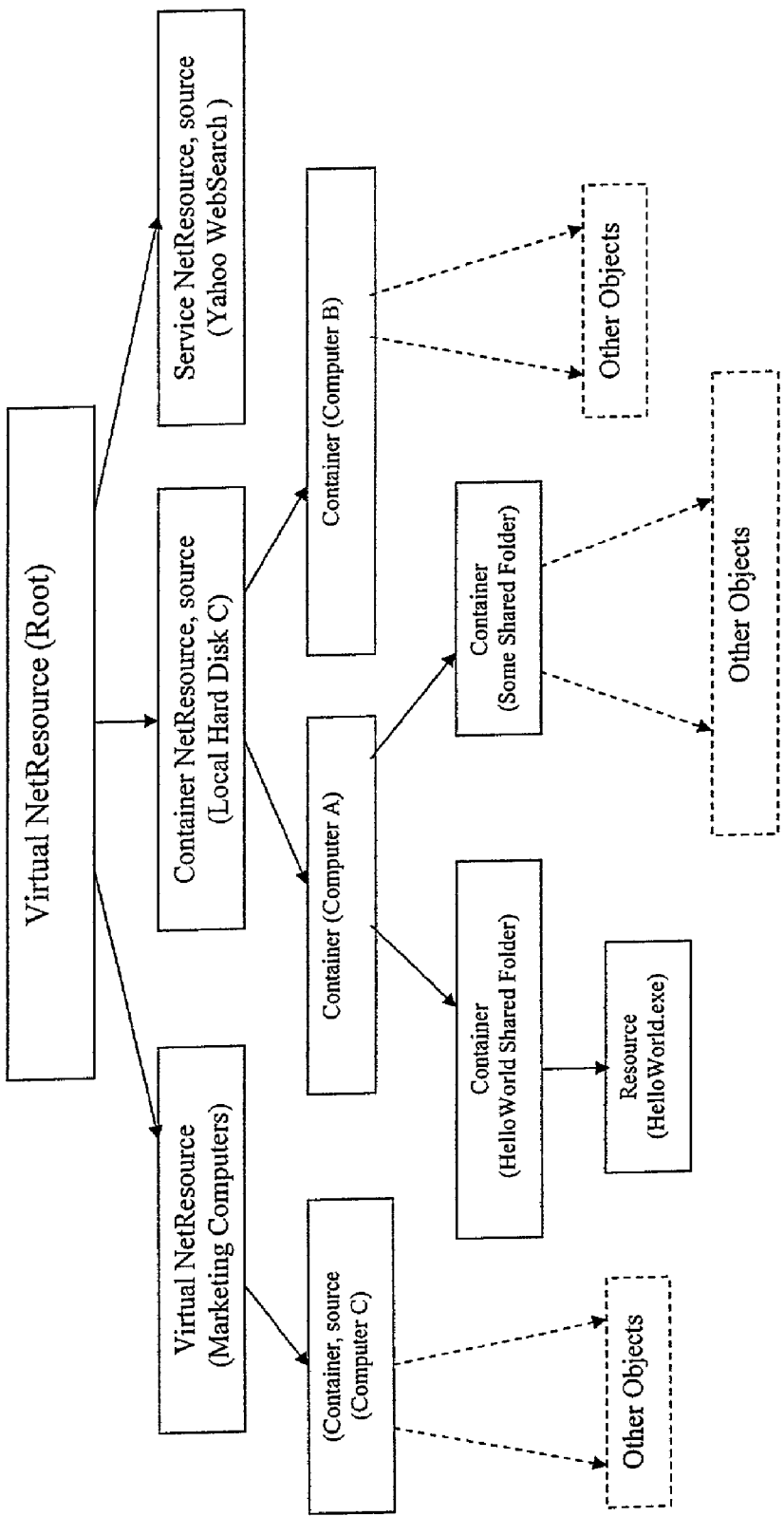
FIG. 4 shows an example of a NetResource tree built from various networked sources and resources.

As shown in FIG. 4, NetResources are organized into a tree of NetResources. The tree starts at the top level with a single Virtual NetResource referred to as the "Root." This NetResource may contain other Virtual NetResources, or other types of NetResource such as a Container or a Service NetResource (a Service NetResource is another NetResource subtype like Container, Virtual, and Resource.) These lower-level NetResources eventually contain, or can return Resource NetResources, which the user can use. The top level non-virtual NetResources are referred to as sources. A source acts like any other NetResource, but represents the root for a branch of non-virtual NetResources within the tree. For example, a source might be a workgroup in the Network Neighborhood. This NetResource, after a Scan, would build a tree of computers (Computer A, Computer B), subsequent shared folders (HelloWorld Folder) and files (HelloWorld.exe) accessible through these computers. This branch, which is composed of NetResources, can be used at any level (i.e.—one could search only the HelloWorld folder.) This branch can be accessed through a series of GetChildren calls. The workgroup is the source because from it spawns the branch. A source is always held by Virtual NetResource.

Figure 1:
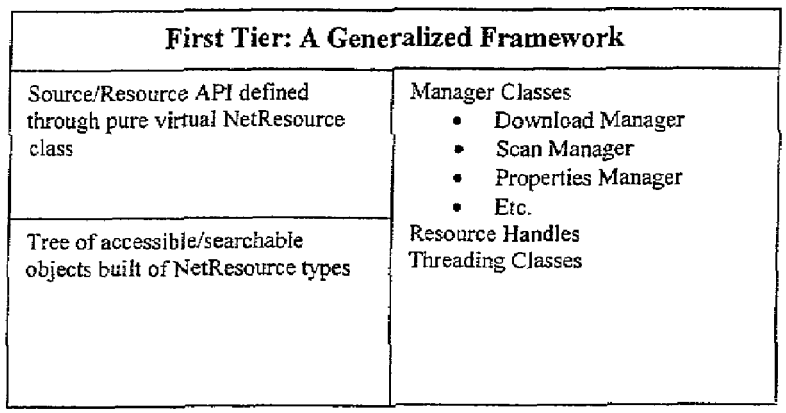
FIG. 1 is a logical diagram showing the components of the first and second tiers in the invention.
Figure 1:
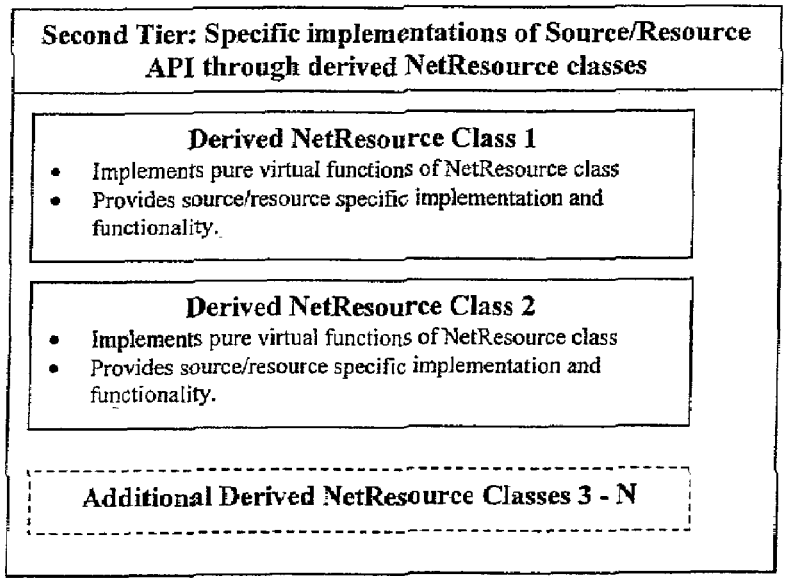

The present invention has several "manager" classes within the first tier (FIG. 1). These manager classes coordinate the various operations of different ongoing processes. Examples are the DownloadManager, ScanManager, ImportManager, or PropertyManager. For example, there is a DownloadManager which manages all active downloads. When a NetResource is to be downloaded, it is passed to the DownloadManager, who handles all the tasks involved in initiating a new download. The DownloadManager tracks statistics about the various ongoing downloads, and can be accessed to get information about ongoing downloads easily. Similarly, the ScanManager handles and tracks active scans in the system. These managers form the top level pieces of the multithreaded architecture. This provides a central location where new tasks can be initiated, and where the various tasks of the program can be globally tracked.

Resource Handles (FIG. 1) implement reference counting for NetResources which allow NetResources to be automatically destroyed when no longer needed. This ensures that NetResources offered to the user aren't subsequently deleted, and handles one major issue of multi-threaded operations.

This invention is heavily multi-threaded, and every scan and copy occurs on a separate thread. The Thread classes provide a logical object for that thread, and support functions such as pausing, resuming, and killing of the thread. While these threads are OS-independent, the functionality for spawning the thread must be defined through specific threading APIs supported by the OSes.

These components all work together to form the first tier of the invention. Use of the invention occurs through the NetResource tree. This tree contains all of the resources available in the system. The user can access the framework through the top level NetResource (The Root) to GetChildren, perform Searches, etc. The NetResource objects returned from various operations to the caller of the invention can be used directly based on the functions they expose. By working entirely with NetResource Objects, users of the invention get the benefits of a common API to interact with different NetResource types, and don't need to address the underlying implementation.

Figure 5:
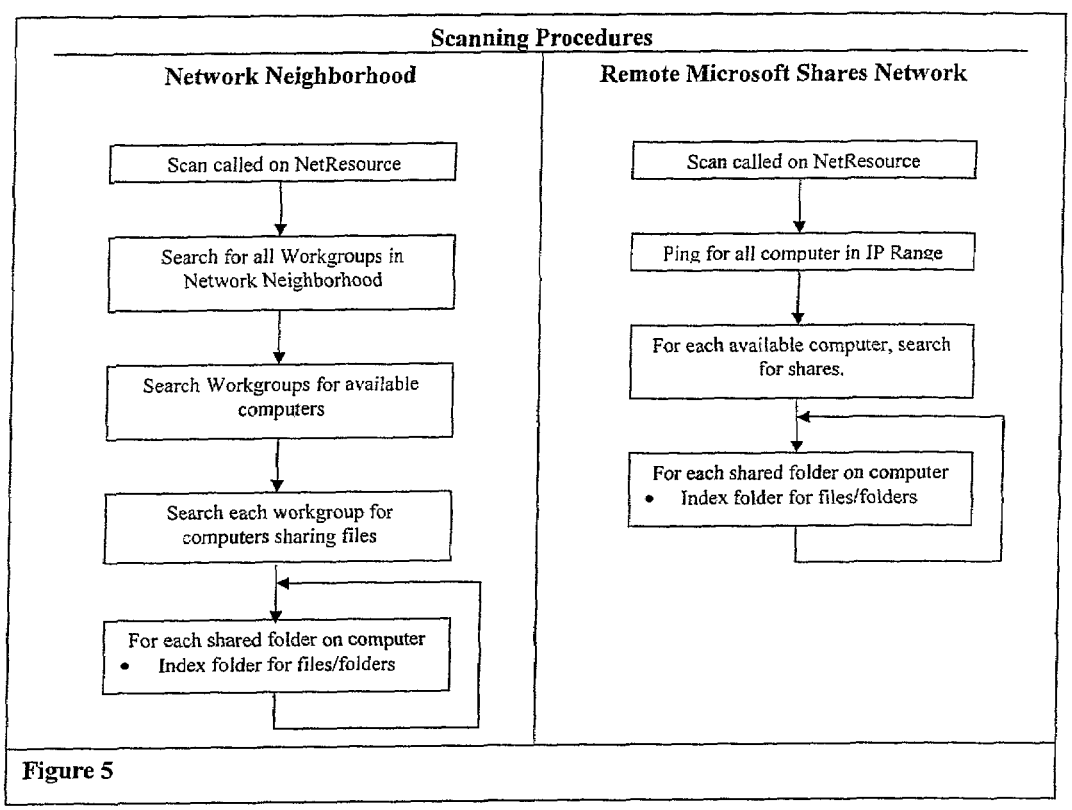
FIG. 5 shows Scanning procedures for two different types of NetResources.

The second tier consists of a set of derived types of the NetResource base class (FIG. 1). These derived NetResource types provide access to network available resources by implementing the virtual functions of the NetResource base class. For example, there is currently a Network Neighborhood NetResource. This NetResource can be added to the NetResource tree as a child of a Virtual NetResource. When Scan is called, the NetResource automatically traverses the Windows "Network Neighborhood" from the top down and tracks all the computers and files it finds along the way (FIG. 5). First it finds all the workgroups in the Network Neighborhood. Then, for each workgroup, it finds all the computers sharing files. Then, for each computer sharing files it recursively indexes the shared folders and files in those folders. The Network Neighborhood NetResource internally stores a representation of these files. Another type of NetResource might be a source for a remote network of Microsoft® Shares. When Scan is called on this NetResource, in contrast to the Network Neighborhood NetResource, it would perform a pinging operation on the various computers. For each available computer, it would then search for shared files. Finally, as in the Network Neighborhood, it would recursively index shared folders and the files in those folders and store this index internally. The methodology for scanning is different but is abstracted and both NetResources respond to the Scan operation in their own way.

Figure 6:
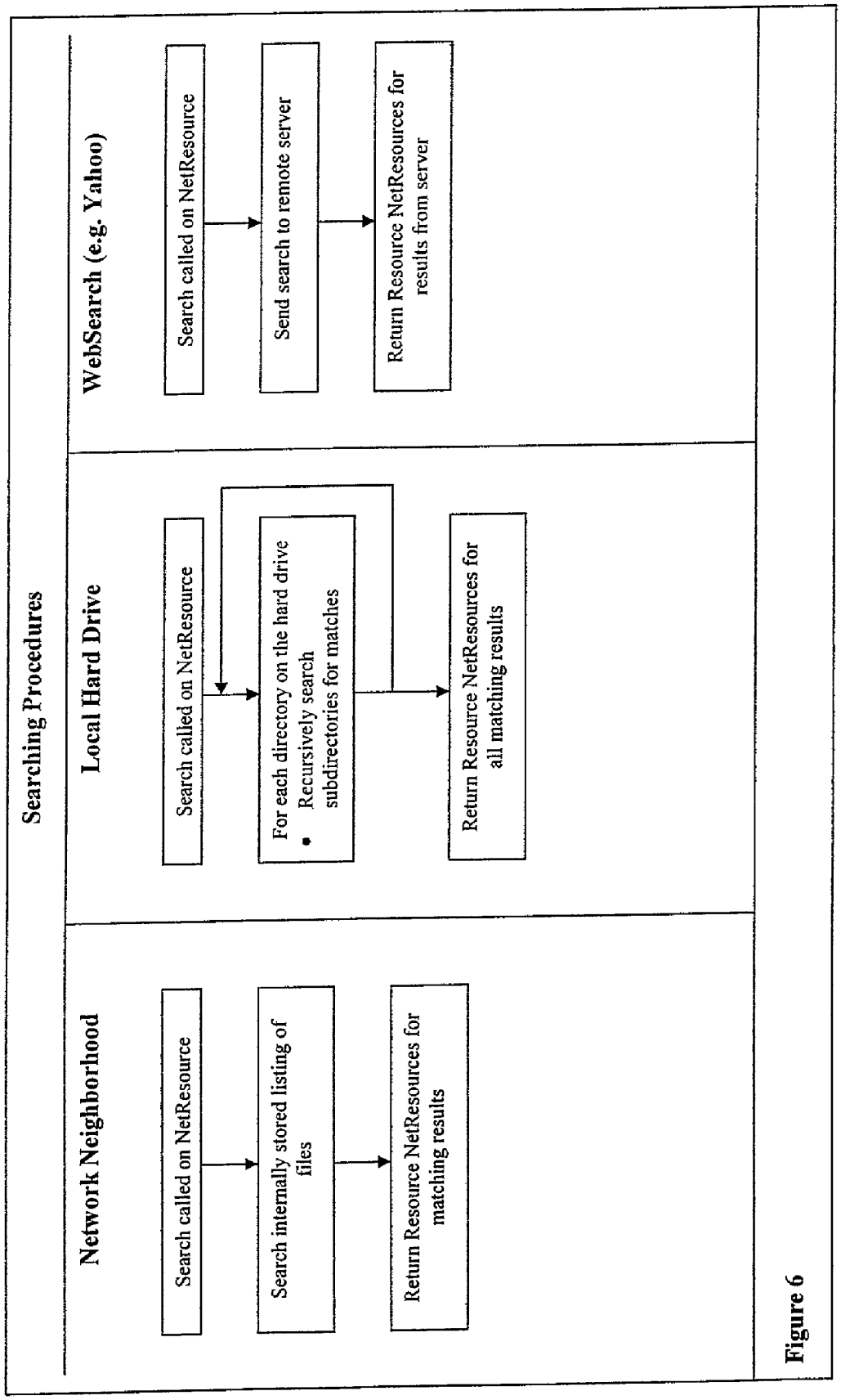
FIG. 6 shows Search procedures for three different types of NetResources.

When Search is called on a Network Neighborhood NetResource, it can search its indexes for matches (FIG. 6). Alternatively, a NetResource type which represents a location on the local hard drive might exist which does not actually index files and hence does not have any internal storage mechanism, but instead searches the hard drive directly when search is called. Another NetResource could pass the search request on to a central server (such as Yahoo!). All three functions return results when finished searching in the form of other NetResource Objects. Other functions of the NetResource, as listed in FIG. 2, operate similarly. For example, a NetResource has a copy function. This can be overloaded by a NetResource representing a local folder to copy a folder, one representing a File to copy the file, and one representing a FTP file to use standard FTP protocols to download the file. In all cases, the methodology of the NetResource is completely transparent.

The modular nature of the system also allows for easy addition of sources, or modification of sources. This is extremely valuable as it allows the potential for the system to grow and accommodate new resources. This invention can also be integrated to create other solutions. Such solutions include allowing remote access to local networks, serving as a backend by building an SQL interpreter, or designing a system whereby multiple instances of the invention can communicate to bridge multiple sets of locally available resources.

The present invention has been described by way of example and in terms of preferred embodiments. However, it is to be understood that the present invention is not strictly limited to the particularly disclosed embodiments. To the contrary, various modifications, as well as similar arrangements, are included within the spirit and scope of the present invention. The scope of the appended claims, therefore, should be accorded the broadest possible interpretation so as to encompass all such modifications and similar arrangements.

What is claimed is:

1. A process of searching for network resources on a network, comprising:
   a) establishing a first search framework tier defining sources/resources API;
   b) establishing a second search framework tier providing specific implementations of the sources/resources API;
   c) describing an action in the first search framework tier corresponding to a search; and
   d) implementing functions defined in the API as according to the described action, in the second tier.

2. The process of claim 1, wherein the first search framework tier includes a tree of accessible/searchable objects built of NetResource types, wherein the NetResource types represent the sources/resources API through a set of virtual functions.

3. The process of claim 2, wherein the tree of accessible/searchable objects built of NetResource types includes at least one virtual NetResource and a plurality of non-virtual NetResources, wherein said at least one virtual NetResource organizes said plurality of non-virtual NetResources into groups and sub-groups.

4. The process of claim 1, wherein the first search framework tier includes manager classes.

5. The process of claim 4, wherein the manager classes are selected from the group consisting of download manager, scan manager, and properties manager.

6. The process of claim 1, wherein the first search framework tier includes resource handles.

7. The process of claim 1, wherein the first search framework tier includes threading classes.

8. A framework, stored on computer-readable media, for creating a search system, comprising:
   an abstraction layer to provide a user with a common interface to heterogeneous network objects;
   wherein the abstraction layer includes
   a) source/resource API defined through at least one virtual NetResource class,
   b) a tree of accessible/searchable objects built of NetResource types,
   c) at least one manager class,
   d) at least one resource handle, and
   e) at least one thread class,
   wherein the NetResource types represent the source/resource API through a set of virtual functions; and
   wherein the at least one NetResource class creates the abstraction layer between a common set of functions in the API and specific implementations that support the API.

9. A search system including the framework of claim 8, wherein:
   a) the framework incorporates self-contained modules containing derived NetResource types;
   b) the search system further comprises means for deploying and combining said modules; and
   c) the abstraction layer allows the user to access heterogeneous network resources and heterogeneous access methodologies of the search system through deployment and combination of said modules.

10. The search system of claim 9, further comprising a tree structure of accessible/searchable objects built of NetResource types, including at least one NetResource subtype.

11. The search system of claim 10, further comprising:
   a) a first Virtual NetResource serving as a root of the tree structure, and
   b) at least one other virtual net resource, wherein said at least one other virtual net resource branches from said first Virtual NetResource.

12. A search system as in claim 10, wherein said at least one NetResource subtype includes at least one of a virtual NetResource, a resource NetResource, a container NetResource, and a service NetResource.

13. A method for scanning a plurality of the container NetResources of claim 12, comprising initiating a call to a common API such that said common API enables a scanning procedure specific to a particular container NetResource.

14. A method for searching the container NetResources of claim 12, comprising initiating a call to a common API such that said common API enables a searching procedure specific to a particular container NetResource.

15. The framework of claim 8, further comprising:
   a) a first search tier defining the sources/resources API; and
   b) a second search tier providing specific implementations of the sources/resources API.

16. A framework as in claim 15, wherein the first search tier includes a tree of accessible/searchable objects built of NetResource types.

17. A framework as in claim 15, wherein the first search tier includes manager classes.

18. A framework as in claim 17, wherein the manager classes are selected from the group consisting of download manager, scan manager, and properties manager.

19. A framework as in claim 15, wherein the first search tier includes resource handles.

20. A framework as in claim 15, wherein the first search tier includes threading classes.

* * * * *